US012769359B2

(12) United States Patent
Yamauchi et al.

(10) Patent No.: US 12,769,359 B2
(45) Date of Patent: Oct. 20, 2026

(54) ELECTRONIC APPARATUS AND CHASSIS MEMBER

(71) Applicant: LENOVO (SINGAPORE) PTE. LTD., Singapore (SG)

(72) Inventors: Takehito Yamauchi, Yokohama (JP); Shigehiro Horiuchi, Yokohama (JP); So Nakanishi, Yokohama (JP); Tatsuya Hosokai, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 78 days.

(21) Appl. No.: 18/988,357

(22) Filed: Dec. 19, 2024

(65) Prior Publication Data

US 2025/0278113 A1 Sep. 4, 2025

(30) Foreign Application Priority Data

Feb. 29, 2024 (JP) ................................ 2024-029880

(51) Int. Cl.
*G06F 1/16* (2006.01)

(52) U.S. Cl.
CPC .................................. *G06F 1/1601* (2013.01)

(58) Field of Classification Search
CPC .... G06F 1/1601; G06F 1/1616; G06F 1/1656; G06F 1/1637; G06F 1/1629
See application file for complete search history.

(56) References Cited

U.S. PATENT DOCUMENTS 10,412,846 B1 * 9/2019 Phan Thanh ............. H05K 5/04
10,778,819 B2 * 9/2020 Kim ...................... H04M 1/026
2010/0315769 A1 * 12/2010 Mathew ................ G06F 1/1637 361/747
2012/0155035 A1 * 6/2012 Chen .................. H04M 1/0266 361/728
2016/0234362 A1 * 8/2016 Moon .................... H04B 1/385
2020/0053897 A1 * 2/2020 Woo .................... H04M 1/0266
2020/0236796 A1 * 7/2020 Hwang ............... B29C 45/0025
(Continued)

FOREIGN PATENT DOCUMENTS

CN 215520555 U 1/2022
CN 218054286 U 12/2022

OTHER PUBLICATIONS

EP search report in application No. 25150441.1, dated Jun. 12, 2025.

*Primary Examiner* — Abhishek M Rathod
(74) *Attorney, Agent, or Firm* — SHIMOKAJI IP

(57) ABSTRACT

An electronic apparatus includes a chassis member having standing walls on edge portions of the chassis member, a display panel having a display surface and a rear surface opposite to the display surface supported by an inner surface of the chassis member, and a glass plate configured to cover the display surface of the display panel, in which an edge surface of an outer edge portion protruding from an outer peripheral side surface of the display panel faces the standing wall, in which an outer edge portion of the glass plate has a corner portion, the standing wall has a corner wall portion that is disposed around the corner portion and has an interior wall surface facing the corner portion, and the interior wall surface of the corner wall portion is provided with a recessed hole recessed in a direction away from the corner portion.

11 Claims, 8 Drawing Sheets

(56) References Cited

U.S. PATENT DOCUMENTS

| | | | | |
|---|---|---|---|---|
| 2020/0264664 | A1* | 8/2020 | Mizoguchi | G06F 1/1656 |
| 2020/0333849 | A1* | 10/2020 | Cho | G06F 1/182 |
| 2021/0034115 | A1 | 2/2021 | Pichumani et al. | |
| 2021/0195772 | A1* | 6/2021 | Ko | G06F 1/1637 |
| 2023/0400890 | A1* | 12/2023 | Seo | G06F 1/1656 |

* cited by examiner

ELECTRONIC APPARATUS AND CHASSIS MEMBER

BACKGROUND OF THE INVENTION

Field of the Invention

The present invention relates to an electronic apparatus and a chassis member.

Description of the Related Art

An electronic apparatus such as a laptop PC includes a display panel configured with a liquid crystal display or the like. For example, Japanese Unexamined Patent Application Publication No. 2023-005541 discloses a configuration in which a display panel is supported by the inner surface of a chassis member having standing walls on the edge portions thereof.

SUMMARY OF THE INVENTION

In the configuration of Japanese Unexamined Patent Application Publication No. 2023-005541, a display surface of a display panel is covered with a glass plate. The glass plate has a corner portion. The standing wall of the chassis member that supports the display panel also has corner wall portions that are disposed to surround the corner portion of the glass plate. Therefore, when such an electronic apparatus receives an impact from being dropped or the like, there is a concern that the standing wall may be deformed by the impact and collide with the corner portion of the glass plate, possibly causing breakage or damage to the glass.

In this regard, in the configuration of Japanese Unexamined Patent Application Publication No. 2023-005541, a thin plate piece provided in a bezel member made of a resin is interposed between the edge surface of the glass plate and the standing wall. Therefore, breakage or the like of the glass due to an impact from being dropped or the like mentioned above, is suppressed to some extent.

Incidentally, it is desired that the bezel width surrounding the outer circumference of the display panel be configured to be as narrow as possible to improve the appearance quality. In the configuration of Japanese Unexamined Patent Application Publication No. 2023-005541, the bezel width is increased by the thickness of the bezel member interposed between the glass plate and the standing wall. On the other hand, in a case in which the bezel member is eliminated from this configuration, there is a concern that the glass may directly interfere with the standing wall and be broken or damaged.

In particular, in the electronic apparatus, there is a model that can be used as a tablet PC by rotating the two chassis up to 360 degrees (see, for example, Japanese Unexamined Patent Application Publication No. 2017-91150). This type of electronic apparatus may be used at a higher position than a general clamshell type PC, for example, above the waist of a standing user. Therefore, in this configuration, the impact at the time of being dropped is further increased, and the breakage of the glass or the like is further problematic.

The present invention has been made in consideration of the above-described problems of the related art, and an object of the present invention is to provide an electronic apparatus and a chassis member capable of suppressing a glass plate from being broken or damaged.

An electronic apparatus according to a first aspect of the present invention includes a chassis member having standing walls on edge portions of the chassis member, a display panel having a display surface and a rear surface opposite to the display surface supported by an inner surface of the chassis member, and a glass plate configured to cover the display surface of the display panel, in which an edge surface of an outer edge portion protruding from an outer peripheral side surface of the display panel faces the standing wall, in which an outer edge portion of the glass plate has a corner portion, the standing wall has a corner wall portion that is disposed around the corner portion and has an interior wall surface facing the corner portion, and the interior wall surface of the corner wall portion is provided with a recessed hole recessed in a direction away from the corner portion.

A chassis member according to a second aspect of the present invention is a chassis member for supporting a display assembly including a display panel having a display surface and a glass plate that covers the display surface and is provided such that an outer edge portion of the glass plate protrudes from an outer peripheral side surface of the display panel, the chassis member including a plate portion configured to support a rear surface of the display panel on a side opposite to the display surface, and a standing wall configured to stand upright from an edge portion of the plate portion, in which the standing wall has a corner wall portion with a recessed hole provided on an interior wall surface of the standing wall.

According to the above-described aspect of the present invention, it is possible to suppress a glass plate from being broken or damaged.

DETAILED DESCRIPTION OF THE INVENTION

Hereinafter, suitable embodiments of the electronic apparatus and the chassis member according to the present invention will be described in detail with reference to the accompanying drawings.

Figure 1:
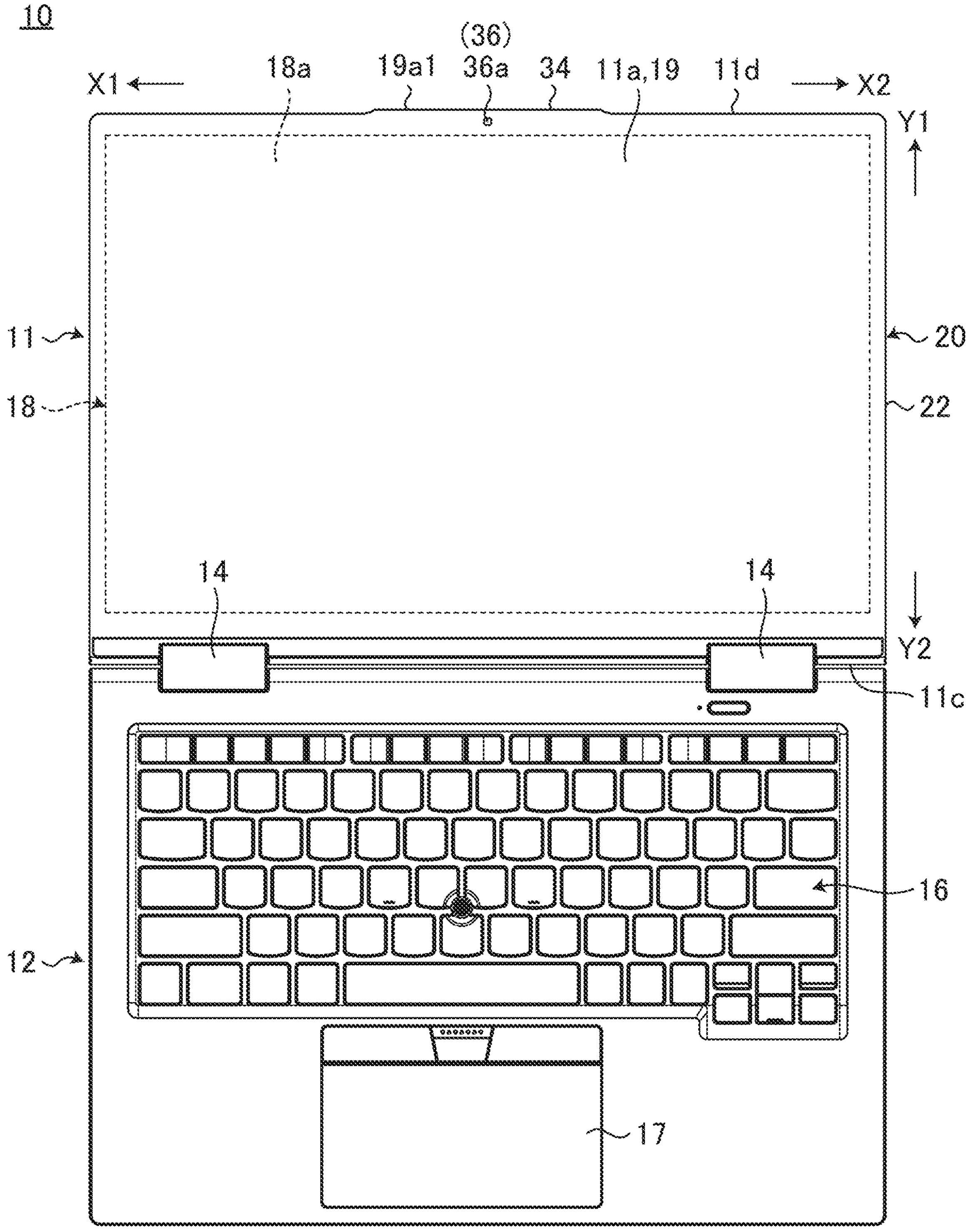
FIG. 1 is a schematic plan view of an electronic apparatus according to an embodiment as viewed from above.

FIG. 1 is a schematic plan view of an electronic apparatus 10 according to an embodiment as viewed from above. The electronic apparatus 10 of the present embodiment has a configuration in which a first chassis 11 and a second chassis 12 are connected to each other by a hinge 14 to be rotationally movable relative to each other.

The electronic apparatus 10 of the present embodiment is a so-called convertible type PC that can be used as a laptop (laptop mode) or a tablet type PC (tablet mode) depending on an angular position between the chassis 11 and 12. The electronic apparatus 10 can set the chassis 11 and 12 at a desired angular position within an angular range of 0 degrees to 360 degrees. The 0 degrees is a position at which the surface directions of the chassis 11 and 12 are parallel to each other and a front surface 11*a* of the first chassis 11 and the surface (keyboard 16) of the second chassis 12 face each other. The 360 degrees is a position at which the surface directions of the chassis 11 and 12 are parallel to each other and a rear surface 11*b* of the first chassis 11 and the bottom surface (surface opposite to the keyboard 16 side) of the second chassis 12 face each other. The electronic apparatus 10 may be various electronic computers such as a general-purpose laptop PC or a tablet type PC having a single plate shape, which can be set at a desired angular position within an angular range of approximately 0 degrees to 180 degrees between the chassis 11 and 12, in addition to the convertible type PC.

The second chassis 12 is a flat box having a rectangular outer shape in a plan view, and is adjacent to the first chassis 11. Inside the second chassis 12, various electronic components such as a motherboard on which a CPU and the like are mounted, a battery device, a memory, an antenna device are accommodated. The keyboard 16 and a touch pad 17 face the upper surface of the second chassis 12.

The first chassis 11 has a rectangular outer shape in a plan view and is a flat box that is thinner than the second chassis 12. A display panel 18 is mounted on the first chassis 11.

Hereinafter, the first chassis 11 and each of the components mounted thereon will be described based on the direction as seen by a user viewing a display surface 18*a* of the display panel 18, with the left-right direction respectively referred to as X1 and X2 directions, the up-down direction respectively referred to as Y1 and Y2 directions, and the depth direction respectively referred to as Z1 and Z2 directions. The X1 and X2 directions are sometimes collectively referred to as the X direction, and the Y1 and Y2 directions and the Z1 and Z2 directions are sometimes similarly referred to as the Y direction and the Z direction.

The display surface 18*a* of the display panel 18 faces the Z1-side surface (front surface 11*a*) of the first chassis 11. The display surface 18*a* is the surface on which the video or image is displayed. The display panel 18 is configured with, for example, a liquid crystal display or an organic EL display. The display panel 18 has a structure in which, for example, glass, a liquid crystal layer, a light guide plate, or the like are laminated, and the outer peripheral edge portions of each layer are fixed to each other with a double-sided tape, an adhesive, or the like.

The display surface 18*a* of the display panel 18 is covered with a glass plate 19. The glass plate 19 is a cover glass that covers substantially the entire front surface 11*a* of the first chassis 11 including the display panel 18. The glass plate 19 can be configured with touch glass corresponding to a touch operation. The glass plate 19 may not support a touch operation.

Figure 2:
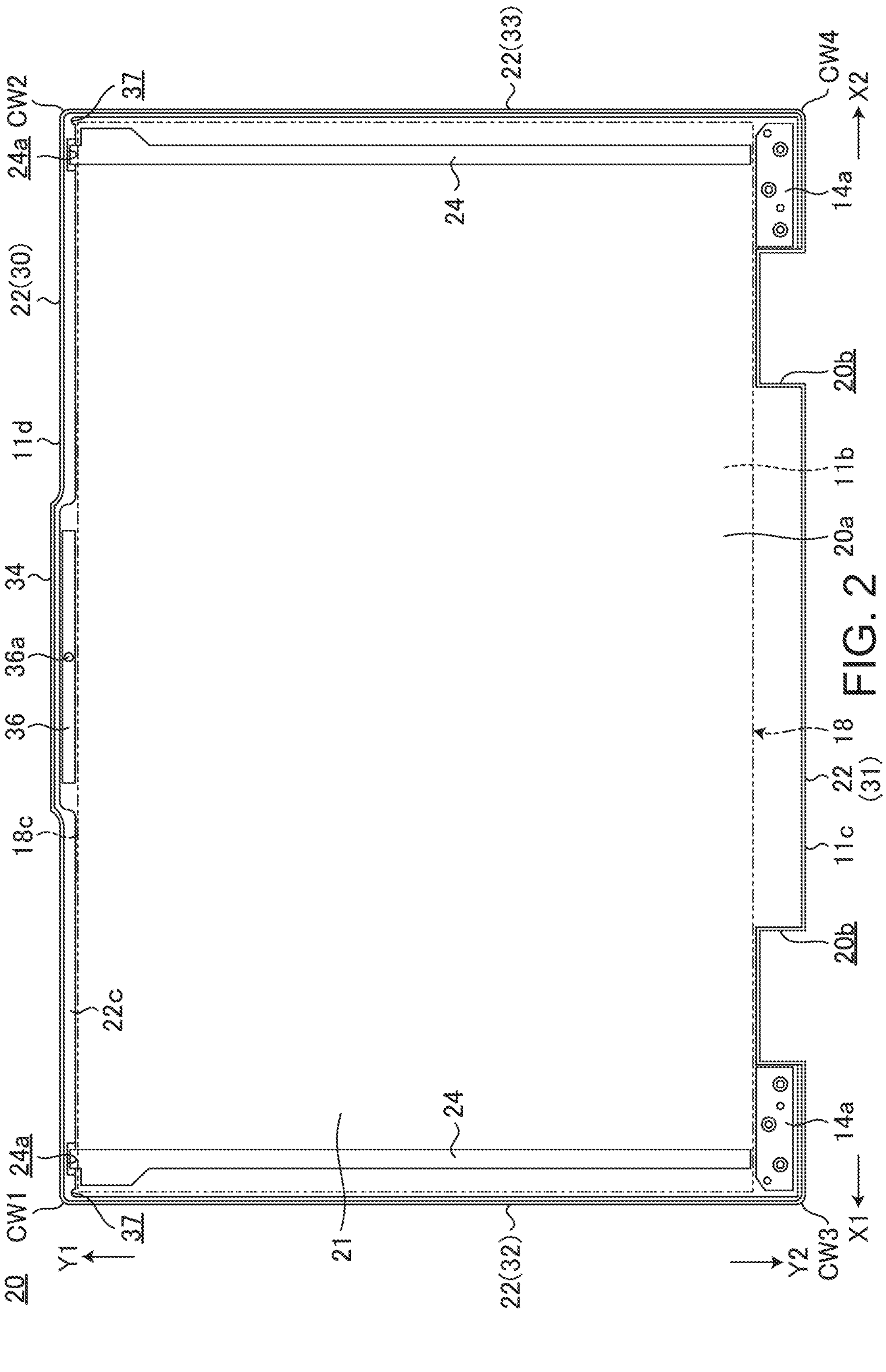
FIG. 2 is a schematic front view of a chassis member.

The first chassis 11 has a chassis member 20. FIG. 2 is a schematic front view of the chassis member 20 constituting the first chassis 11. FIG. 2 shows an inner surface 20*a* (back surface of the rear surface 11*b*) of the chassis member 20 and predetermined components installed on the inner surface 20*a*.

The chassis member 20 has a rectangular plate portion 21 and a standing wall 22 standing upright from the outer peripheral edge portion of the plate portion 21. The chassis member 20 has a shallow bathtub shape. The plate portion 21 forms the Z2-side surface (rear surface 11*b*) of the first chassis 11. The standing wall 22 is provided to surround most of the four sides of the plate portion 21 and stands in the Z1 direction. The chassis member 20 is made of, for example, metal and is formed of, for example, an aluminum alloy or a magnesium alloy. The chassis member 20 may be made of a resin. The chassis member 20 may be configured by joining a frame material that constitutes the standing wall 22 to the periphery of the plate portion 21 formed of, for example, a carbon fiber reinforced resin.

The chassis member 20 supports a rear surface 18*b* of the display panel 18 on a side opposite to the display surface 18*a* with the inner surface 20*a*. Specifically, the rear surface 18*b* of the display panel 18 is fixed to the inner surface 20*a* of the plate portion 21 by using a double-sided adhesive tape 24.

The hinge 14 is connected to the Y2-side edge portion (edge portion 11*c*) of the first chassis 11 in a pair of left and right directions. A reference numeral 14*a* in FIG. 2 denotes a hinge fixing portion to which the hinge 14 is fixed. In a case in which the chassis member 20 is made of metal, the hinge fixing portion 14*a* can form a screw thread by direct processing on the plate portion 21. In a case where the chassis member 20 is made of a resin, the hinge fixing portion 14*a* can be formed of a metal bracket to which the hinge 14 can be screwed. The chassis member 20 has a cutout portion 20*b* in which the hinge 14 is disposed on a side portion of the hinge fixing portion 14*a*.

The display panel 18 according to the present embodiment can be used as a display assembly 26 in which the glass plate 19 is fixed to the display surface 18*a*. As described above, the rear surface 18*b* of the display panel 18 is fixed to the chassis member 20 by the double-sided adhesive tape 24. In this case, the outer periphery of the glass plate 19 extends along the inner periphery of the standing wall 22. As a result, the display assembly 26 is attached to the chassis member 20.

Next, an assembly structure of the display assembly 26 with respect to the chassis member 20 will be described.

Figure 3:
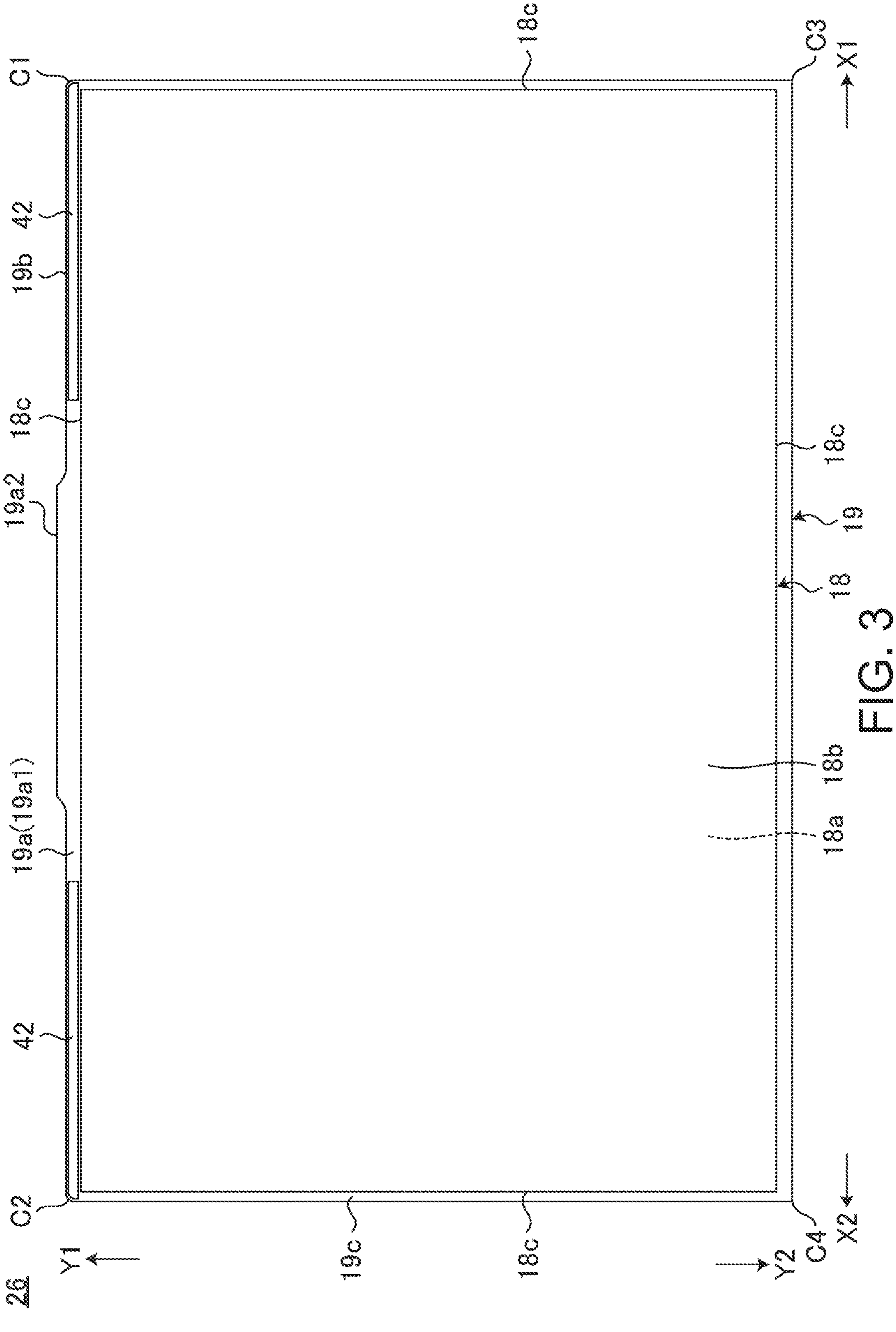
FIG. 3 is a rear view of a display assembly.
Figure 4:
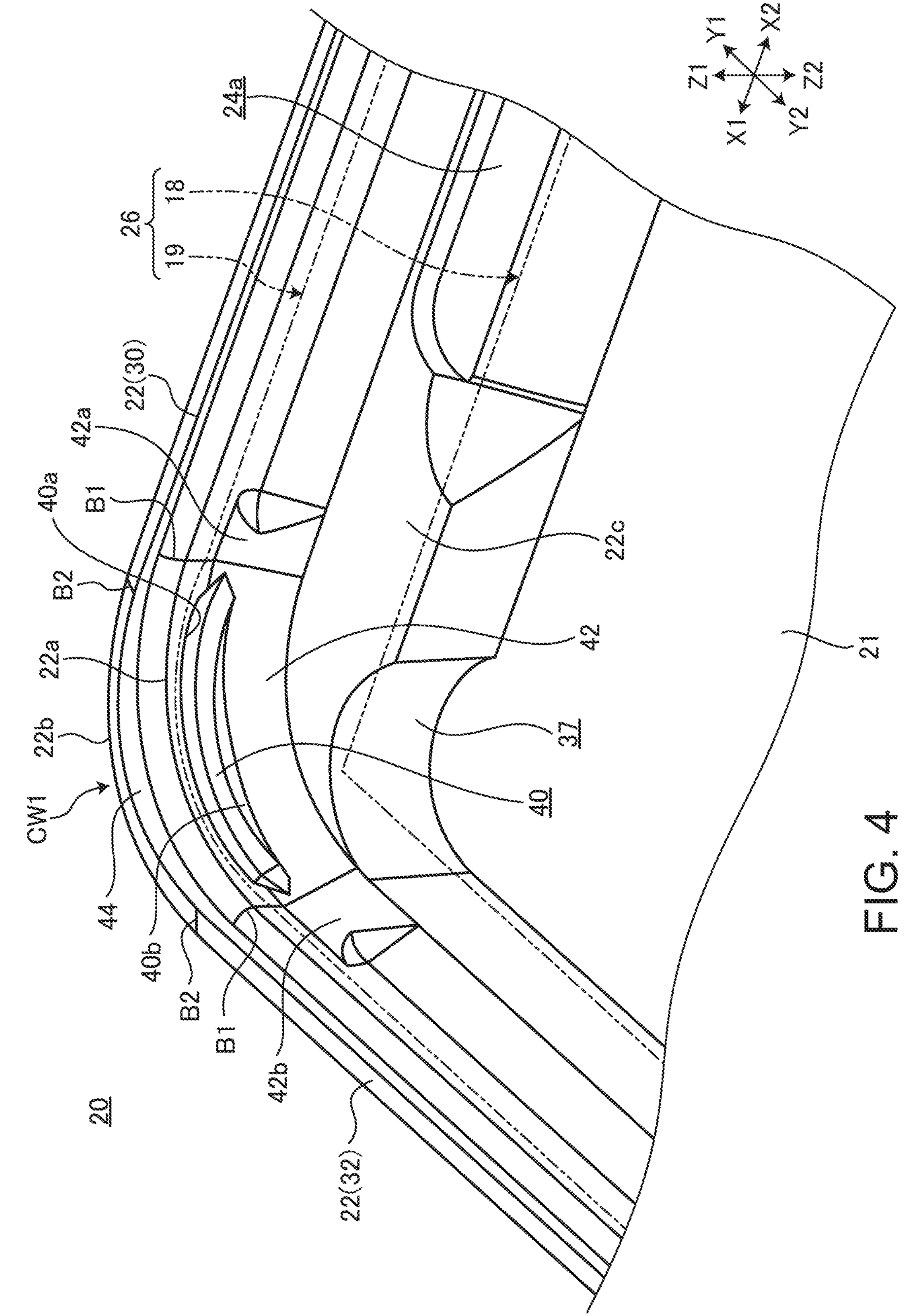
FIG. 4 is an enlarged perspective view of a part of the chassis member.
Figure 5A:
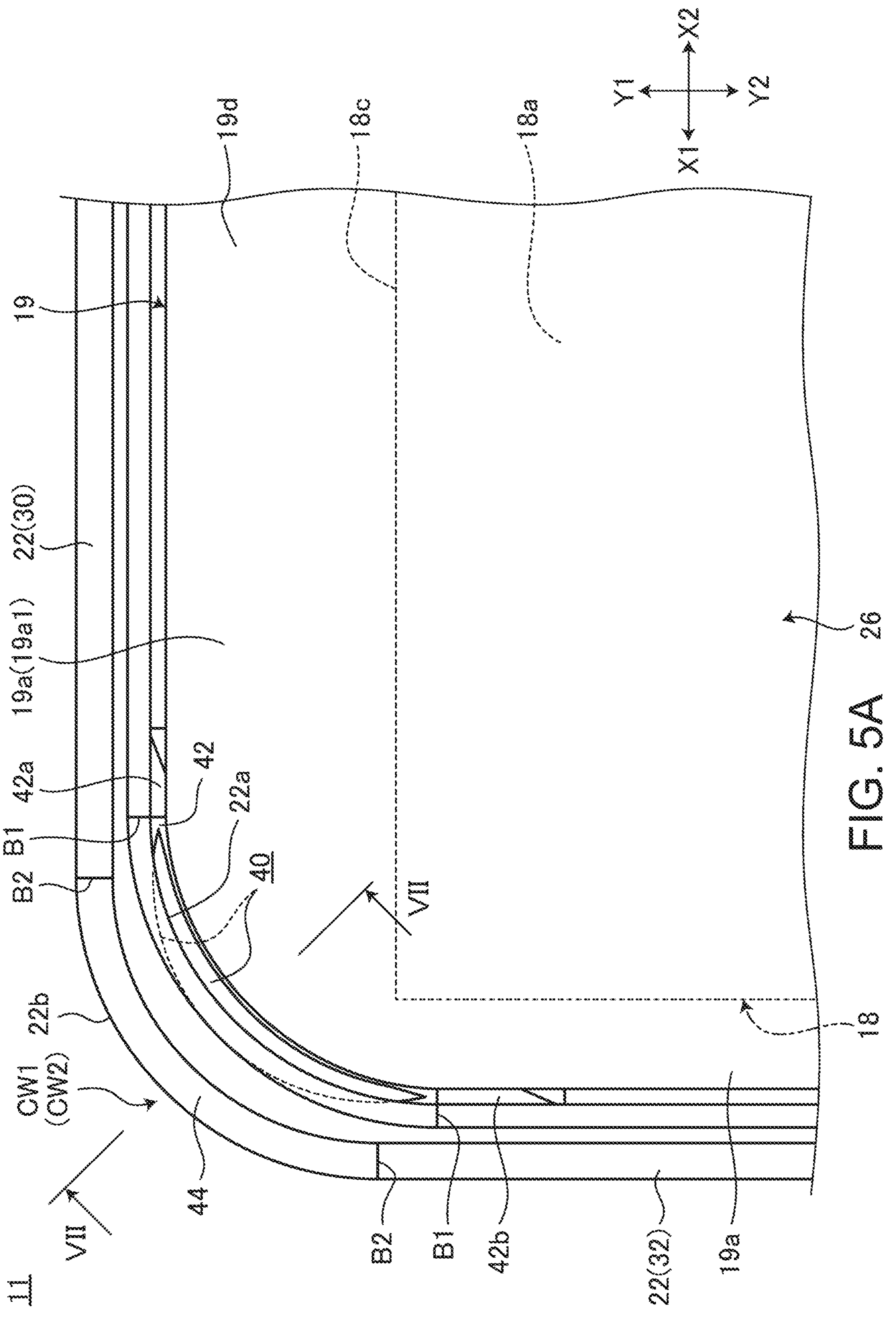
FIG. 5A is an enlarged plan view of a corner wall portion of a first chassis and a peripheral portion thereof.
Figure 5B:
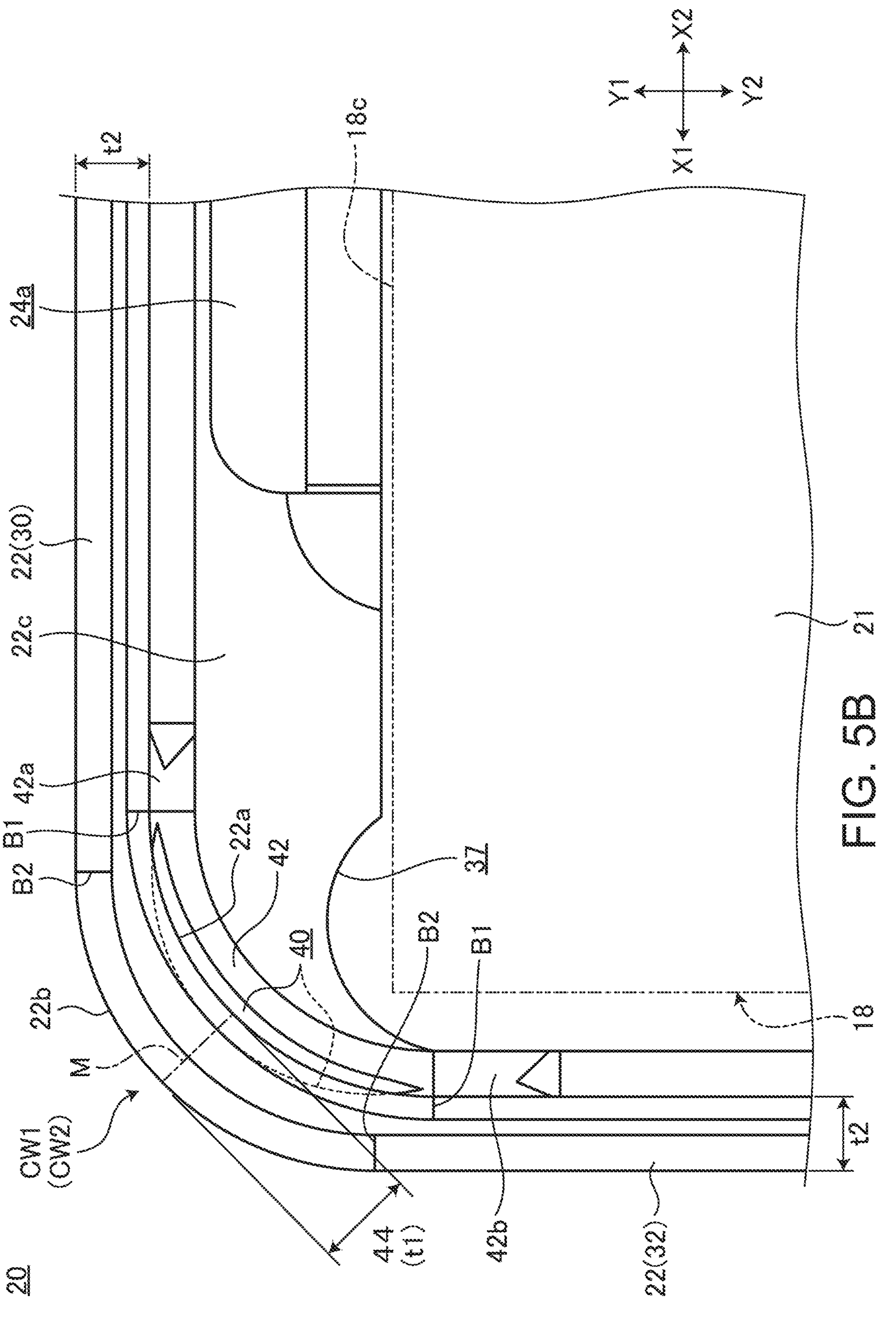
FIG. 5B is a plan view showing a state in which the display assembly is detached from the chassis member shown in FIG. 5A.
Figure 6:
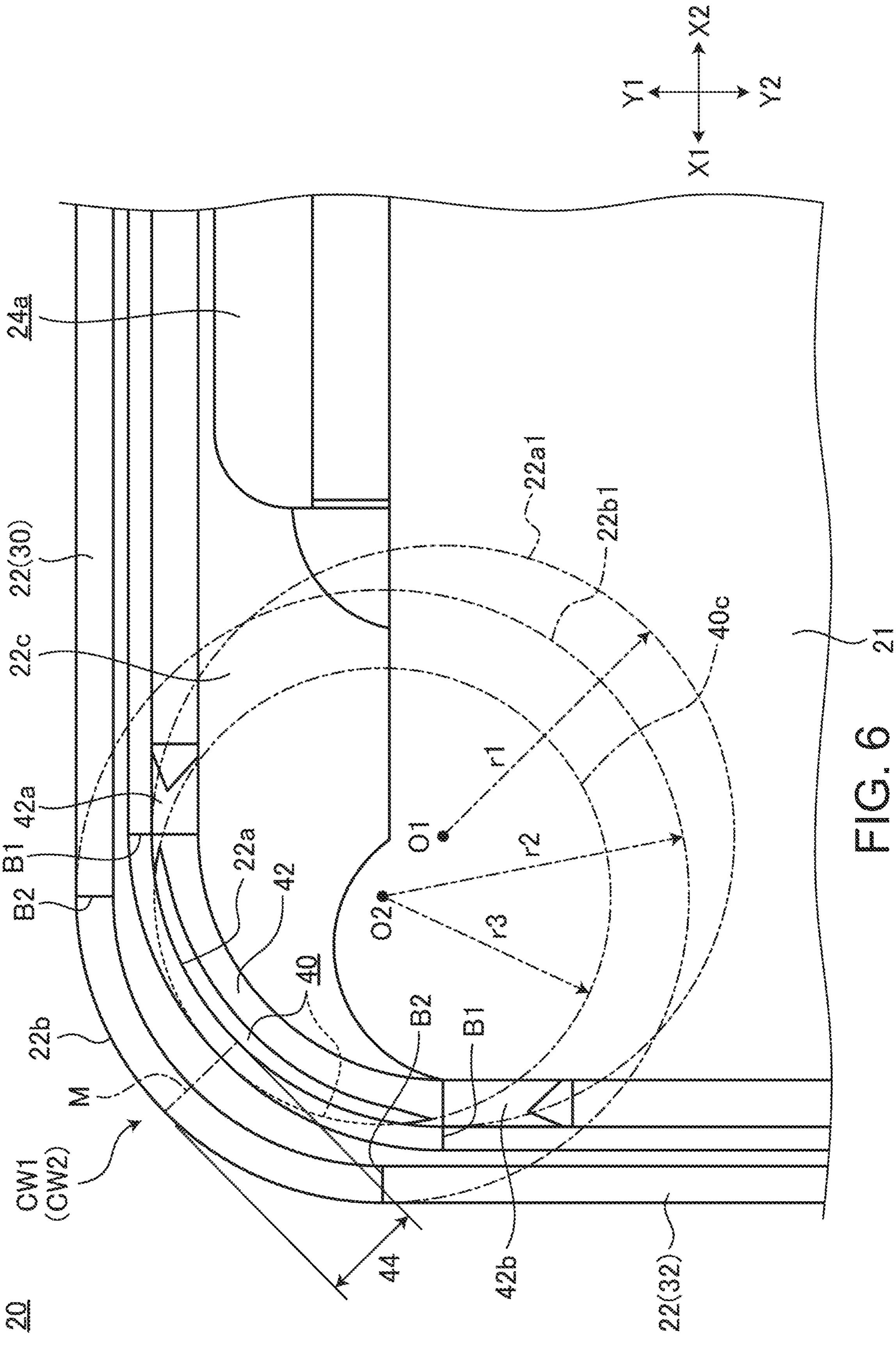
FIG. 6 is a view showing a shape of the chassis member shown in FIG. 5B.
Figure 7:
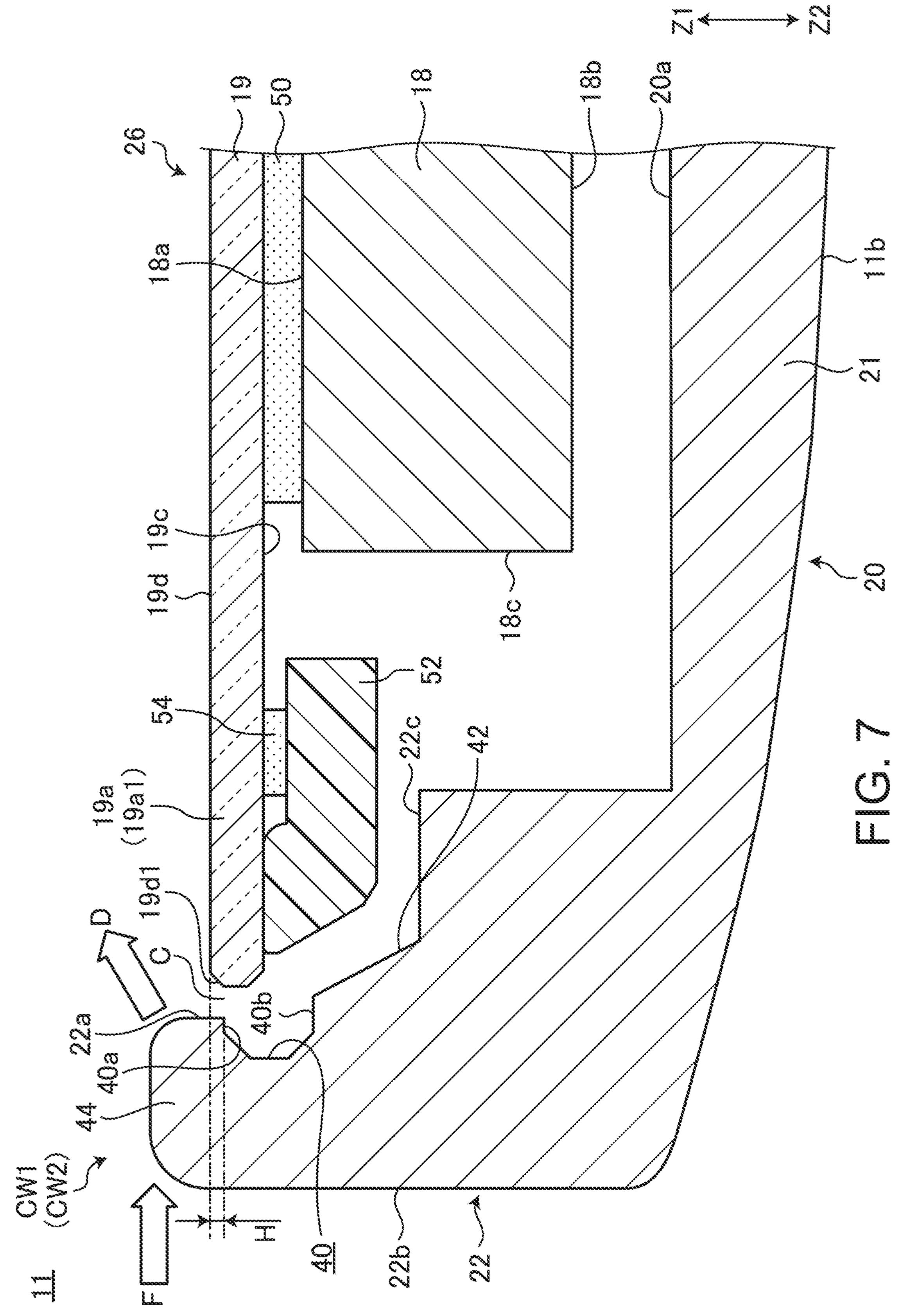
FIG. 7 is a schematic cross-sectional view along a line VII-VII in FIG. 5A.

FIG. 3 is a rear view of the display assembly 26. FIG. 4 is an enlarged perspective view of a part of the chassis member 20, specifically, a corner wall portion CW1 and a peripheral portion thereof. FIG. 5A is an enlarged plan view of the corner wall portion CW1 of the first chassis 11 and a peripheral portion thereof. FIG. 5B is a plan view in which the display assembly 26 is detached from the chassis member 20 shown in FIG. 5A. FIG. 6 is a view showing a shape of the chassis member 20 shown in FIG. 5B. FIG. 7 is a schematic cross-sectional view taken along the line VII-VII in FIG. 5A.

First, a schematic configuration of the standing wall 22 will be described.

As shown in FIGS. 2 and 4 to 7, the standing wall 22 has an interior wall surface 22*a* facing the inside of the first chassis 11 and an exterior wall surface 22*b* facing the outside of the first chassis 11 on a side opposite to the interior wall surface 22*a*. The interior wall surface 22*a* faces a direction of an outer peripheral side surface 18*c* of the display panel 18. The exterior wall surface 22*b* is painted on the surface as necessary, and forms an outer surface of the chassis member 20.

The standing wall 22 extends to surround the entire periphery of the first chassis 11. The standing wall 22 has a pair of horizontal walls 30 and 31 extending in the X direction and a pair of vertical walls 32 and 33 extending in the Y direction. The walls 30 to 33 are linear standing walls (linear wall portions) extending along the X direction or the Y direction.

One horizontal wall 30 constitutes the Y1-side edge portion (edge portion 11*d*) of the first chassis 11. The horizontal wall 30 extends over substantially the entire length of the edge portion 11*d*. The first chassis 11 of the present embodiment has a bulging portion 34 that bulges outward (Y1 side) at a central portion of the edge portion 11*d* in the longitudinal direction (see FIG. 2). The bulging portion 34 expands a space between the standing wall 22 (horizontal wall 30) and the outer peripheral side surface 18*c* of the display panel 18, and secures an installation space for a high-performance camera module 36. The camera module 36 includes a camera lens 36*a*. The camera lens 36*a* is a camera that can be used for video capturing or the like, has a lens for focusing in the center, and has an image sensor provided on a back side of the lens. The camera module 36 can further include an IRLED (infrared camera), an illuminance sensor, and the like.

The vertical walls 32 and 33 extend along the Y direction and are perpendicular to the horizontal walls 30 and 31, respectively. As a result, corner wall portions CW1 to CW4 are formed at the four corners of the standing wall 22. The horizontal wall 30 and the vertical walls 32 and 33, which are linear wall portions, are respectively continuous from both ends of the corner wall portions CW1 and CW2 and extend in directions perpendicular to each other.

As shown in FIGS. 2 and 4, the horizontal wall 30 can have a support surface 22*c* below the interior wall surface 22*a* (on the base side of the standing wall 22). The support surface 22*c* is an upper surface of a high ridge that is one step higher than the inner surface 20*a*, and protrudes to the Y1 side from a lower end of the interior wall surface 22*a*. The support surface 22*c* can support resin members 52 described later. The support surface 22*c* is provided on at least the horizontal wall 30 on the Y1 side, but may be similarly provided on the other walls 31 to 33.

The horizontal wall 30 of the present embodiment has a recess 24*a* on the side of the corner wall portions CW1 and CW2. The recess 24*a* is formed by cutting out a part of the support surface 22*c* in the Y1 direction. The recess 24*a* can be used to dispose the end portions of the double-sided adhesive tape 24. In the horizontal wall 30, a recess 37 in which the support surface 22*c* is cut out in an arc shape in the Y1 direction is further formed between the recess 24*a* and the corner wall portions CW1 and CW2. The recess 37 is an escape portion for preventing the corners of the display panel 18 from colliding with the standing wall 22 due to an impact when the electronic apparatus 10 is dropped on a floor surface or the like.

The corner wall portions CW1 and CW2 of the standing wall 22 can have all or a part of recessed holes 40, an inclined portion 42, and a thick-walled portion 44. Details of the recessed holes 40 and the like will be described later.

Next, a configuration of the display assembly 26 will be described.

As shown in FIGS. 3, 5A, and 7, the display assembly 26 is a laminate in which the glass plate 19 is fixed to the display surface 18*a* of the display panel 18.

The glass plate 19 can be fixed by an adhesive member 50 that is transparent to the display surface 18*a*. The surface area of the glass plate 19 is slightly larger than the surface area of the display panel 18. Therefore, the glass plate 19 has an eave-like outer edge portion 19*a* that protrudes outward from the outer peripheral side surface 18*c* of the display panel 18.

In the glass plate 19, an edge surface 19*b* of the outer edge portion 19*a* faces the interior wall surface 22*a* of the standing wall 22 with a predetermined gap C therebetween. The gap C is, for example, 0.2 mm. Specifically, among the four standing walls 22, the horizontal wall 30 on the Y1 side and the left and right vertical walls 32 and 33 have the interior wall surface 22*a* facing the edge surface 19*b* with the gap C therebetween. Since the hinge 14 or the components related to the wiring line are disposed between the edge surface 19*b* and the horizontal wall 31 on the Y2 side, the gap between the interior wall surface 22*a* and the edge surface 19*b* is wide, for example, 10 mm or more.

Corner portions C1 to C4 that are curved along the corner wall portions CW1 to CW4 of the chassis member 20 are formed at four corners of the glass plate 19. The corner portions C1 and C2 provided at one end and the other end of the outer edge portion 19*a* on the Y1 side in the longitudinal direction face the interior wall surfaces 22*a* of the corner wall portions CW1 and CW2 with the gap C therebetween. The corner portions C3 and C4 provided at both ends of the outer edge portion 19*a* on the Y2 side are disposed with the same gap as the wide gap (for example, 10 mm or more) between corner wall portions CW3 and CW4 and the horizontal wall 31 described above.

The display assembly 26 can further have a pair of left and right resin members 52 and 52. The resin member 52 can be fixed to a back surface 19*c* of the outer edge portion 19*a* of the glass plate 19 on the Y1 side by using an adhesive member 54 (see FIG. 7). The adhesive member 54 can be exemplified by a double-sided adhesive tape, an adhesive, or a bonding agent. Hereinafter, the outer edge portion 19*a* of the glass plate 19 that extends in the X direction on the Y1 side may be referred to as an "outer edge portion 19*a*1". A bulging portion 19*a*2 corresponding to the shape of the bulging portion 34 is formed on the outer edge portion 19*a*1 on the Y1 side at a central portion in the longitudinal direction. The chassis member 20 may be configured not to have the bulging portion 34. In this case, the bulging portion 19*a*2 of the glass plate 19 can also be omitted, and the outer edge portion 19*a*1 can be formed in a linear shape extending in the X direction.

As shown in FIGS. 3 and 7, the resin member 52 is a strip-shaped resin part extending in the X direction. The resin member 52 on the X1 side extends from a position close to the corner portion C1 to the front of the bulging portion 19*a*2. The resin member 52 on the X2 side extends from a position close to the corner portion C2 to the front of the bulging portion 19*a*2. The resin member 52 is disposed on the support surface 22*c* of the horizontal wall 30 with a slight gap. Each resin member 52 can form a protrusion or a hook that is aligned with or engages with, for example, a recessed portion or a plate piece formed on the support surface 22*c* of the horizontal wall 30.

In the glass plate 19, the corner portions C1 and C2 at both ends of the outer edge portion 19*a*1 face the corner wall portions CW1 and CW2 of the standing wall 22 with the narrow gap C therebetween. That is, the corner wall portions CW1 and CW2 are respectively disposed to be close to each other so as to surround the corner portions C1 and C2. In this case, a resin part such as a bezel member is not interposed in the gap C. As a result, the electronic apparatus 10 reduces the width of the bezel surrounding the display assembly 26.

On the other hand, the corner portions C3 and C4 on the Y2 side are disposed at positions separated from the corner wall portions CW3 and CW4 by a certain distance. This is because the metal bracket 14*a* or the like is disposed on the edge portion 11*c*, and thus there is a limit to the reduction in the width of the bezel. Depending on the structure of the hinge 14, the metal bracket 14*a*, or the like, the corner wall portions CW3 and CW4 may be disposed close to each other so as to surround the corner portions C3 and C4.

As described above, in the electronic apparatus 10 of the present embodiment, at least the corner portions C1 and C2 and the corner wall portions CW1 and CW2 face each other at positions close to each other, for example, with the gap C of 0.2 mm therebetween. Therefore, when the electronic apparatus 10 receives an impact from being dropped with the corner wall portions CW1 and CW2 facing down, particularly in a manner known as corner drop, there is a concern that the corner wall portions CW1 and CW2 of the standing wall 22 will be deformed toward the inside of the first chassis 11. In this case, there is a concern that the deformed corner wall portions CW1 and CW2 collide with the edge surface 19*b* and the glass plate 19 is broken or damaged. In particular, the chassis member 20 can be made of a metal such as an aluminum alloy. In this case, since the metal standing wall 22 abuts against the glass plate 19, there is a concern that the glass plate 19 may be broken or damaged.

Therefore, as shown in FIGS. 4, 5B, and 7, the electronic apparatus 10 of the present embodiment can be provided with the recessed holes 40, the inclined portion 42, and the thick-walled portion 44 in the corner wall portions CW1 and CW2.

The recessed holes 40, the inclined portion 42, and the thick-walled portion 44 have a structure for suppressing the corner wall portions CW1 and CW2 from colliding with the glass plate 19. It is most preferable that the recessed holes 40, the inclined portion 42, and the thick-walled portion 44 are provided at the same time. Only one or two of the recessed holes 40, the inclined portion 42, and the thick-walled portion 44 may be provided, for example, only the recessed holes 40 may be provided. In a case in which the corner portions C3 and C4 and the corner wall portions CW3 and CW4 are close to each other or the like, the recessed holes 40 and the like can also be provided in the corner wall portions CW3 and CW4.

Hereinafter, as shown in FIGS. 4 to 7, the configuration of the corner wall portion CW1 on the X1 side will be typically described. The corner wall portion CW2 on the X2 side can have the same or similar structure as the corner wall portion CW1 shown in FIGS. 4 to 7, except that the corner wall portion CW2 has a left-right symmetrical structure with the corner wall portion CW1. Therefore, the detailed description of the corner wall portion CW2 will be omitted.

First, the recessed hole 40 is a hollowed-out recess provided in the interior wall surface 22*a* of the corner wall portion CW1. The recessed hole 40 is recessed in a direction away from the corner portion C1 of the glass plate 19, that is, in a direction from the interior wall surface 22*a* toward the exterior wall surface 22*b*. The recessed hole 40 is curved in a bow shape along the outer edge of the corner portion C1. The recessed hole 40 has a shape that allows the interior wall surface 22*a* to be prevented from colliding with the corner portion C1 when the corner wall portion CW1 is deformed and moved toward the glass plate 19 side.

As shown in FIG. 7, in a case in which the standing direction (Z1 direction) of the standing wall 22 is used as a reference, an upper end 40*a* of the recessed hole 40 can be at a height position equal to or lower than the surface 19*d* of the glass plate 19. The surface 19*d* of the glass plate 19 is a surface opposite to the back surface 19*c* and is a surface that constitutes most of the front surface 11*a* of the first chassis 11. In the configuration example shown in FIG. 7, the upper end 40*a* is at a position (Z2 side) lower than the surface 19*d* by a height H. For example, the height H can be set to be approximately equal to the height of a chamfered portion 19*d*1 provided on the edge surface 19*b* of the glass plate 19 in the Z direction. The height H of the present embodiment is, for example, 0.1 mm.

In a case in which the standing direction of the standing wall 22 is used as a reference, the lower end 40*b* of the recessed hole 40 can be at a position (Z2 side) lower than the back surface 19*c* of the glass plate 19. In the configuration example shown in FIG. 7, the Z-direction height of the back surface 19*c* is near the center of the Z-direction height of the recessed hole 40.

Next, the inclined portion 42 is an inclined surface provided on the interior wall surface 22*a* of the corner wall portion CW1. The inclined portion 42 is gradually inclined to the display panel 18 side (plate portion 21 side) toward the base side (Z2 side) of the corner wall portion CW1. The inclined portion 42 is curved along the interior wall surface 22*a* that is curved along the corner wall portion CW1. The inclined portion 42 is a gradient provided at a base portion of the corner wall portion CW1. The inclined portion 42 has a bank shape that wraps around the inner periphery of the corner wall portion CW1. The inclined portion 42 is a reinforcing shape for suppressing the deformation of the corner wall portion CW1 toward the glass plate 19 side when the corner drop of the electronic apparatus 10 happens.

The length of the inclined portion 42 can extend to the horizontal wall 30 and the vertical wall 32 adjacent to the corner wall portion CW1. In the inclined portion 42 of the configuration example shown in FIGS. 4 and 5A, one end portion 42*a* reaches the interior wall surface 22*a* of the horizontal wall 30, and the other end portion 42*b* reaches the interior wall surface 22*a* of the vertical wall 32.

The corner wall portion CW1 has high rigidity by including the inclined portion 42. In particular, the corner wall portion CW1 can ensure sufficient strength by the inclined portion 42 while the recessed hole 40 is provided. As shown in FIGS. 4 and 7, the recessed hole 40 is formed so as to hollow out a part of the inclined portion 42. In other words, the upper end of the inclined portion 42 can be set to be above (Z1 side) the lower end 40*b* of the recessed hole 40.

Next, the thick-walled portion 44 has a plate thickness t1 of the corner wall portion CW1 larger than a plate thickness t2 of the horizontal wall 30 and vertical wall 32 that are adjacent to each other (see FIG. 5B). That is, the corner wall portion CW1 can have a larger wall thickness than the linear wall portions (walls 30, 32, and 33) extending along the outer peripheral side surface 18*c*. The thick-walled portion 44 is a reinforcing shape for increasing the plate thickness of the corner wall portion CW1 itself to suppress deformation of the corner wall portion CW1 toward the glass plate 19 when the corner drop of the electronic apparatus 10 happens.

As shown in FIG. 5B, the interior wall surface 22*a* and the exterior wall surface 22*b* of the corner wall portion CW1 each have an arc shape (quarter circle shape). The corner wall portion CW1 has a gradually increasing plate thickness from boundaries B1 and B2 with the linear wall portions (walls 30 and 32) toward a middle M of the corner. As a result, the plate thickness of the corner wall portion CW1 is changed such that the plate thickness is maximized in the vicinity of the middle M. The boundary B1 indicates a boundary on the interior wall surface 22*a* side. The boundary B2 indicates a boundary on the exterior wall surface 22*b* side.

It is preferable that the thick-walled portion 44 has a uniform symmetrical structure in which a portion extending to the horizontal wall 30 side and a portion extending to the vertical wall 32 side are centered on the middle M of the corner wall portion CW1. As a result, it is possible to suppress occurrence of an unintended stress concentration at various places of the thick-walled portion 44 during the corner drop and to more effectively suppress deformation of the corner wall portion CW1.

A virtual circle **22*a*1 shown by a one-dot chain line in FIG. 6 is obtained by extending a locus of a circle passing through the interior wall surface 22*a* of the corner wall portion CW1. A virtual circle 22*b*1 is obtained by extending a locus of a circle passing through the exterior wall surface 22*b* of the corner wall portion CW1. A virtual circle 40*c* is obtained by extending a locus of a circle passing through the bottom portion of the recessed hole 40. A center point O1 in FIG. 6 indicates a center of the virtual circle 22*a*1. A center point O2 indicates the center of the virtual circle 22*b*1, 40*c*. Radii r1, r2, and r3 in FIG. 6 indicate radii of the virtual circles 22*a*1, 22*b*1, and 40*c***, respectively.

As shown in FIG. 6, the center O1 of the virtual circle **22*a*1 drawing the interior wall surface 22*a* is at a position offset to the inside of the chassis member 20 from the center O2 of the virtual circle 22*b*1 drawing the exterior wall surface 22*b*. More specifically, the centers O1 and O2 are on a 45-degree line passing through the middle M of the corner wall portion CW1, and the center O2 is at a position closer to the interior wall surface 22*a* than the center O1. In the present embodiment, the radius r1 of the virtual circle 22*a*1 can be slightly smaller than or the same as the radius r2 of the virtual circle 22*b*1. The radius r3 of the virtual circle 40*c* can be set to be the same as a radius of the corner portion C1 of the glass plate 19**.

Accordingly, in the corner wall portion CW1, the boundary B1 between the interior wall surface **22*a* and the linear wall portions (walls 30 and 32) and the boundary B2 between the exterior wall surface 22*b* and the linear wall portions (walls 30 and 32) are misaligned in the X direction or the Y direction (see FIG. 6). As a result, the corner wall portion CW1 can form the thick-walled portion 44 whose thickness increases uniformly from the boundaries B1 and B2 with the walls 30 and 32** toward the middle M.

As described above, the electronic apparatus 10 of the present embodiment can include the chassis member 20 having the standing wall 22 on the edge portions thereof, the display panel 18 having the rear surface **18*b* supported by the inner surface 20*a* of the chassis member 20, and the glass plate 19 that covers the display surface 18*a* of the display panel 18 and of which the edge surface 19*b* of the outer edge portion 19*a* protruding from the outer peripheral side surface 18*c* faces the standing wall 22. The standing wall 22 has the corner wall portions CW1 and CW2 disposed to surround the corner portions C1 and C2 of the glass plate 19 and having the interior wall surfaces 22*a* facing the corner portions C1 and C2. The interior wall surfaces 22*a* of the corner wall portions CW1 and CW2 are provided with recessed holes 40 recessed in a direction away from the corner portions C1 and C2**.

The chassis member 20 of the present embodiment can be used to support the display assembly 26 including the display panel 18 and the glass plate 19 provided such that the outer edge portion **19*a* protrudes from the outer peripheral side surface 18*c*. The chassis member 20 includes the plate portion 21 for supporting the rear surface 18*b* of the display panel 18 and a standing wall 22 that stands upright from an edge portion of the plate portion 21. The standing wall 22 has the corner wall portions CW1 and CW2 in which the interior wall surface 22*a* is provided with the recessed holes 40**.

In such electronic apparatus 10 and chassis member 20, the corner wall portions CW1 and CW2 may be deformed toward the inside of the first chassis 11 due to an external force such as corner drop. Even in this case, the electronic apparatus 10 can allow the edge surface **19*b* of the glass plate 19 to escape with the recessed hole 40 provided on the interior wall surfaces 22*a* of the corner wall portions CW1 and CW2. As a result, the electronic apparatus 10 can suppress the standing wall 22 from colliding with the edge surface 19*b* of the glass plate 19. Accordingly, the electronic apparatus 10 can suppress the glass plate 19** from being broken or damaged due to an impact from being dropped or the like.

Here, as shown in FIG. 7, a case in which an external force F is applied to the corner wall portion CW1 (CW2) is considered. In this case, it is assumed that the standing wall 22 is deformed in a direction (movement direction) D indicated by an arrow in the drawing. This is because the rigidity of the upper portion (the distal end portion on the Z1 side) of the standing wall 22 in the standing direction is the lowest. Then, the standing wall 22 is moved to the glass plate 19 side such that the recessed hole 40 engulfs the edge surface **19*b*. As a result, the interior wall surface 22*a* is prevented from colliding with the edge surface 19*b***.

Therefore, when the upper end **40*a* of the recessed hole 40 is at a height position equal to or lower than the surface 19*d* of the glass plate 19 in the Z direction, interference with the edge surface 19*b* can be effectively prevented. In addition, when the lower end 40*b* of the recessed hole 40 is at a position lower than the back surface 19*c* of the glass plate 19 in the Z direction, interference with the edge surface 19*b*** can be effectively prevented.

In particular, the electronic apparatus 10 may be used as a tablet type PC by rotating the chassis 11 and 12 by 360 degrees. In this case, the electronic apparatus 10 may be used at a position higher than a general clamshell type PC, for example, above the waist of the standing user. However, even in a case in which the electronic apparatus 10 is dropped from such a height, the recessed hole 40 can suppress the glass plate 19 from being broken or the like.

The electronic apparatus 10 and the chassis member 20 can also have the inclined portion 42 on the interior wall surfaces **22*a* of the corner wall portions CW1 and CW2. The electronic apparatus 10 and the chassis member 20 can also have the thick-walled portion 44 in which the plate thickness t1 of the corner wall portions CW1 and CW2 is larger than the plate thickness t2 of the horizontal wall 30 and the vertical wall 32 and 33 which are the adjacent linear wall portions. In this way, the strength of the corner wall portions CW1 and CW2 of the standing wall 22 is improved. As a result, the electronic apparatus 10 can suppress the corner wall portions CW1 and CW2 being deformed due to an impact from being dropped or the like, and can suppress the glass plate 19** from being broken or the like.

Here, the result of the drop experiment of the electronic apparatus 10 will be described. In this drop experiment, the electronic apparatus 10 (example) having the recessed hole 40, the inclined portion 42, and the thick-walled portion 44 in the corner wall portions CW1 and CW2 and the electronic apparatus (comparative example) not having the recessed hole 40, the inclined portion 42, and the thick-walled portion 44 were used. In the drop experiment, the electronic apparatus 10 of the example and the electronic apparatus of the comparative example were freely dropped on the floor from heights of 650 mm, 700 mm, and 750 mm, respectively.

As a result of the experiment, in the electronic apparatus of the comparative example, the glass plate 19 was not broken at 650 mm, but the glass plate 19 was broken at 700 mm and 750 mm. On the other hand, in the electronic apparatus 10 of the example, the glass plate 19 was not broken at any of 650 mm, 700 mm, and 750 mm. As a result, it was confirmed that the recessed hole 40, the inclined portion 42, and the thick-walled portion 44 are effective in suppressing the glass plate 19 from being broken when the electronic apparatus 10 is dropped.

The present invention is not limited to the above-described embodiment, and it goes without saying that the present invention can be freely modified without departing from the gist of the present invention.

The invention claimed is:

1. An electronic apparatus comprising:
a chassis member having a standing wall on an edge portion of the chassis member;
a display panel having a display surface and a rear surface opposite to the display surface and that is supported by an inner surface of the chassis member; and
a glass plate configured to cover the display surface of the display panel, wherein the glass plate includes an edge surface of an outer edge portion protruding from an outer peripheral side surface of the display panel and faces the standing wall, wherein
the outer edge portion of the glass plate has a corner portion,
the standing wall has a corner wall portion that is disposed around the corner portion of the glass plate and has an interior wall surface facing the corner portion of the glass plate,
the interior wall surface of the corner wall portion has a recessed hole recessed in a direction away from the corner portion of the glass plate,
the interior wall surface lies along a first locus of a first virtual circle having a first radius,
the recessed hole lies along a second locus of a second virtual circle having a second radius that differs in length from the first radius, and
the first and second virtual circles lie in at least one plane generally parallel to a plate portion of the chassis member.

2. The electronic apparatus according to claim 1, wherein
an upper end of the recessed hole is at a height equal to or lower than a front surface of the glass plate.

3. The electronic apparatus according to claim 2, wherein
a lower end of the recessed hole is lower than a back surface of the glass plate.

4. The electronic apparatus according to claim 1, wherein
the interior wall surface of the corner wall portion has an inclined portion that is inclined to a display panel side toward a base side of the corner wall portion.

5. The electronic apparatus according to claim 1, wherein
the standing wall has a linear wall portion that extends along the outer peripheral side surface of the display panel, and
a plate thickness of the corner wall portion is larger than a plate thickness of the linear wall portion adjacent to the corner wall portion.

6. The electronic apparatus according to claim 5, wherein
the corner wall portion has an exterior wall surface that forms an outer surface of the chassis member on a side opposite to the interior wall surface,
the interior wall surface and the exterior wall surface of the corner wall portion have an arc shape, and
the plate thickness of the corner wall portion gradually increases towards a center of its corner.

7. The electronic apparatus according to claim 1, further comprising:
a first chassis having the chassis member and having a rectangular outer shape;

a second chassis having a rectangular outer shape and adjacent to the first chassis; and
a hinge configured to rotatably connect one edge portion of the first chassis and one edge portion of the second chassis, wherein
the standing wall has:
a pair of vertical walls that extend along a pair of edge portions perpendicular to the edge portion of the first chassis to which the hinge is connected and forms the corner wall portion, and
a horizontal wall that extends perpendicular to the pair of vertical walls on a side opposite to the edge portion of the first chassis to which the hinge is connected and forms another corner wall portion, and
the recessed hole is in each of the corner wall portions between the pair of vertical walls and the horizontal wall.

8. A chassis member for supporting a display assembly including a display panel having a display surface and a glass plate that covers the display surface and is provided such that an outer edge portion of the glass plate protrudes from an outer peripheral side surface of the display panel, the chassis member comprising:
a plate portion configured to support a rear surface of the display panel on a side opposite to the display surface; and
a standing wall configured to stand upright from an edge portion of the plate portion,
wherein the standing wall has a corner wall portion with a recessed hole on an interior wall surface of the standing,
the interior wall surface lies along a first locus of a first virtual circle having a first radius,
the recessed hole lies along a second locus of a second virtual circle having a second radius that differs in length from the first radius, and
the first and second virtual circles lie in at least one plane generally parallel to a plate portion of the chassis member.

9. The chassis member according to claim 8, wherein
an interior wall surface of the corner wall portion has an inclined portion that is inclined toward a base side of the corner wall portion.

10. The chassis member according to claim 8, wherein
the standing wall has a pair of linear wall portions that are continuous from both ends of the corner wall portions and extend in directions perpendicular to each other, and
a plate thickness of the corner wall portion is larger than a plate thickness of the linear wall portions adjacent to the corner wall portion.

11. An electronic apparatus comprising:
a chassis member having a standing wall on an edge portion of the chassis member;
a display panel having a display surface and a rear surface opposite to the display surface and that is supported by an inner surface of the chassis member; and
a glass plate configured to cover the display surface of the display panel, wherein the glass plate includes an edge surface of an outer edge portion protruding from an outer peripheral side surface of the display panel and faces the standing wall, wherein
the outer edge portion of the glass plate has a corner portion, the standing wall has a corner wall portion that is disposed around the corner portion of the glass plate and has an interior wall surface facing the corner portion of the glass plate, the interior wall surface of the corner wall portion has a recessed hole recessed in a direction away from the corner portion of the glass plate, the interior wall surface lies along a first locus of a first virtual circle having a first center, the recessed hole lies along a second locus of a second virtual circle having a second center that is offset from the first center, and the first and second virtual circles lie in at least one plane generally parallel a plate portion of the chassis member.

* * * * *